United States Patent [19]
Cox et al.

[11] Patent Number: 5,979,165
[45] Date of Patent: *Nov. 9, 1999

[54] PROCESS FOR SUPERCOOLING

[75] Inventors: David Robert Cox, Bedford; Stephen Raymond Moore, Northampton, both of United Kingdom

[73] Assignee: Good Humor-Breyers Ice Cream, Green Bay, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/752,107

[22] Filed: Nov. 20, 1996

[30] Foreign Application Priority Data

Nov. 20, 1995 [EP] European Pat. Off. ............ 95308280

[51] Int. Cl.⁶ .................................................. F25D 25/00
[52] U.S. Cl. ...................................... 62/62; 62/66; 62/99
[58] Field of Search .................................. 62/62, 68, 69, 62/70, 340, 348

[56] References Cited

U.S. PATENT DOCUMENTS

| | | | |
|---|---|---|---|
| 4,798,061 | 1/1989 | LaConte | 62/348 |
| 4,832,972 | 5/1989 | Toledo-Flores et al. | 426/327 |
| 5,011,524 | 4/1991 | Ruff | 62/348 |
| 5,296,251 | 3/1994 | Ishida et al. | 426/592 |
| 5,379,603 | 1/1995 | Welch et al. | 62/348 |

FOREIGN PATENT DOCUMENTS

| | | |
|---|---|---|
| 2120659 | 10/1994 | Canada . |
| 1 286 288 | 8/1971 | United Kingdom . |
| 2 251 863 | 7/1992 | United Kingdom . |
| 92/20420 | 11/1992 | WIPO . |
| 93/04096 | 3/1993 | WIPO . |

OTHER PUBLICATIONS

Miyawaki et al., A Numerical Model to Describe Freezing of Foods when Supercooling Occurs,Journal of Food Engineering, 9(2), pp. 143–151 (1989).

Arora et al., *An Investigation of the Fre4ezing of Supercooled Liquid in Forced Turbulent Flow Inside Circular Tubes,* International Journal of Heat and Mass Transfer, vol. 16, pp. 2077–2085, Pergman Press, U.K. (1973).

Derwent abstract of WO 93/389122 and Japanese application 5285304 with Derwent abstract believed to be equivalent.

Derwent abstract of WO 87/288359 and Japanese application 62201565 with Derwent abstract believed to be equivalent.

Henney, L. description of the Metastable Zone.

Maurandi, V. *Nucleation Kinetics in Supersaturated Solutions—A Review* Zuckerind 106 (1981) Nr. 11 pp. 993–997.

Mullin, J. W. *Crystallization,* 3rd Ed. pp. 117–118, p. 180 and pp. 189–193, 1993.

Mullin, J. W. *Crystallization,* 2nd Ed. pp. 178–180, 1972.

J.W. Mullin, "Crystallistion", Butterworth–Heinemann, Third Edition, 1993.

J. Mullin, "Crystallisation", Butterworth, 1972, pp. 178–179 and Fig. 6.4

International Search Report InternationalPatent ApplicationNo. PCT/EP 96/04803.

(List continued on next page.)

*Primary Examiner*—Ronald C. Capossela
*Attorney, Agent, or Firm*—James J. Farrell

[57] ABSTRACT

A process for supercooling a liquid or solid wherein the solid or liquid is placed in contact with a coolant, the coolant having a temperature of at or just above the metastable limit temperature of the liquid or solid.

7 Claims, 1 Drawing Sheet

OTHER PUBLICATIONS

Patent Abstracts of Japan of JP 221829 —published Aug. 23, 1990.
Patent Abstracts of Japan of JP 356163 —published Dec. 9, 1992.
Patent Abstracts of Japan JP 4036153 —published Feb. 6, 1992.
European Search Report European Patent Application No. EP95308280.
Derwent Abstract of EP0619137—published Oct. 12, 1994.
Derwent Abstracts of Japan of JP55044382—published Mar. 29, 1980.
Patent Abstracts of Japan of JP55044382—published Mar. 29, 1980.
Derwent Abstract of JP5285304—published Nov. 2, 1993.
Derwent Abstract of SU1011149—published Apr. 15, 1983.
Derwent Abstract of JP1111402—published Apr. 28, 1989.

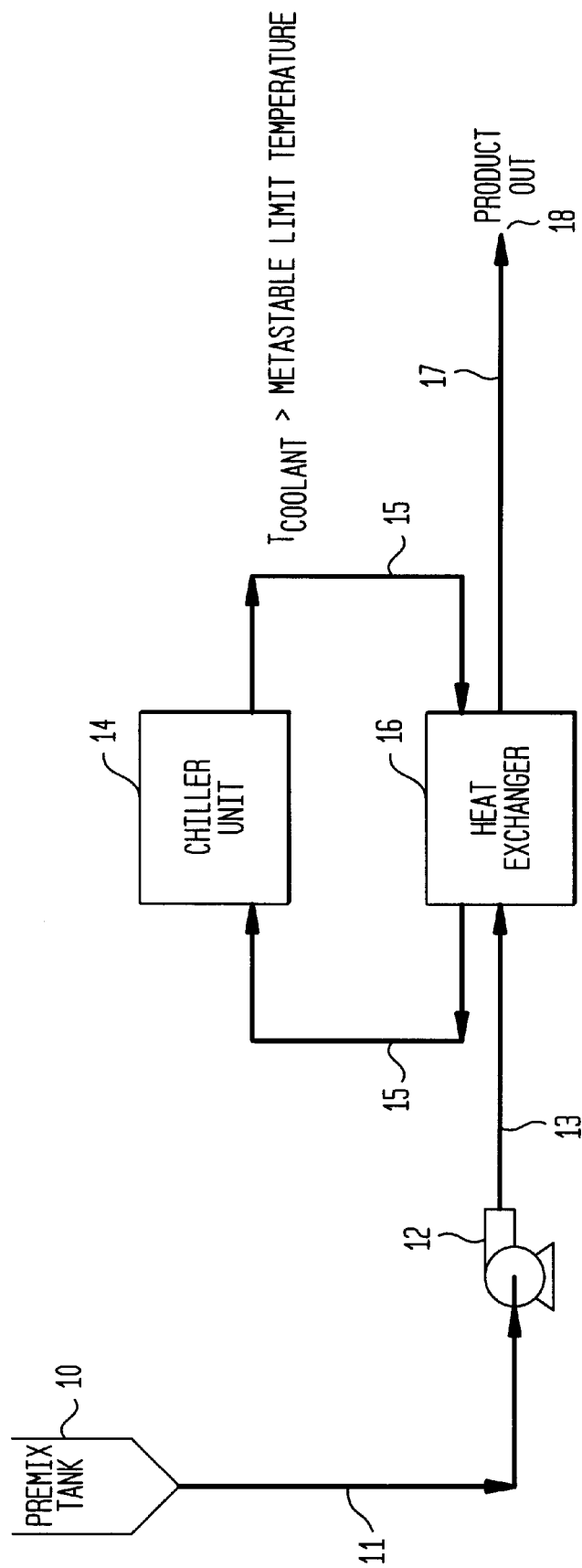

PROCESS FOR SUPERCOOLING

FILED OF THE INVENTION

The invention relates to a process for supercooling liquids or solids.

BACKGROUND OF THE INVENTION

High levels of supercooling are not generally required in industrial processes for two related reasons. Firstly, the supercooled state is unstable and spontaneous crystallisation can theoretically occur at any time. Secondly, nucleation from a highly supersaturated system is rapid, leading to small crystal sizes. In many industrial processes, where crystallisation is used as a separation technique, large crystals rather than small crystals are required.

However, although for industrial separation processes crystallisation at high levels of supercooling is seen as a disadvantage, there are areas, especially within the food industry, where the small crystals resulting from high nucleation rates are an advantage.

It would therefore be advantageous to be able to achieve a high degree of supercooling in a liquid or solid. To date attempts to achieve a high degree of supercooling have been unsuccessful. In academic studies high levels of supercooling have been created by rapidly freezing very small samples of material. At industrial scale, however, any method for producing, handling and utilising supercooled materials must ensure that crystallisation does not take place until required. Thus supercooling to approximately only 1° C. below the equilibrium freezing temperature of the material has been achieved.

The state of the art is confirmed by the teaching given in the latest edition of the book "Crystallisation" (J. W. Mullin, 1993, Butterworth-Heinemann). This book states that supercooling below about 0.5° C. is not possible in a stirred system.

We have now observed that by determining the metastable limit temperature for a system, we are able to controllably produce materials cooled close to the metastable limit temperature without inducing crystallisation. Thus supercooling to temperatures greater than 1° C. below the equilibrium freezing temperature of the material can be achieved.

The term "metastable limit temperature" is a well known term within the art. A suitable method for measurement is described in "Crystallisation", J Mullin, Butterworth 1972, p.178 & 179 and FIG. 6.4.

GENERAL DESCRIPTION OF THE INVENTION

Accordingly, the invention provides a process for supercooling a liquid or solid wherein the solid or liquid is placed in contact with a coolant, the coolant having a temperature of at or just above the metastable limit temperature of the liquid or solid providing that when the coolant has a temperature equal to the metastable limit temperature of the liquid or solid to be supercooled, the cooling system used is indirect.

In particular it is possible to supercool aerated liquids such as an ice cream pre-mix using the process of the invention.

Any suitable coolant may be used. Typical coolants include brine, glycol, water/alcohol mixtures, liquid ammonia, cold gases for example air, nitrogen, carbon dioxide etc.

By "just above the metastable limit temperature" is meant that the coolant temperature is from about 0.001° C. above the metastable limit temperature for the solid or liquid to about 1.5° C. below the equilibrium freezing temperature, preferably from about 0.1° C. to about 2° C. above the metastable limit temperature for the solid or liquid, more preferably from about 0.1° C. to about 1.5° C. above the metastable limit temperature for the solid or liquid, most preferably from about 0.1° C. to about 1° C. above the metastable limit temperature for the solid or liquid.

By "solid" is meant any solid that has a high liquid content for example fruit and vegetables, or a liquid contained within a solid matrix or other boundary.

Supercooling of the material can be carried out in a batch or continuous system using direct or indirect cooling.

Thus for example when a solid is to be supercooled, the solid may conveniently be placed directly into the coolant liquid or gas. Solids which may advantageously be supercooled to a high degree include fruit and vegetables. When a liquid is to be supercooled, the liquid will typically be contained within a suitable vessel which is then brought into contact with the coolant.

EXAMPLES

Examples 1–4

The equilibrium melting temperature of 25 wt % sucrose solution is −2.1° C. The metastable limit of 25 wt % sucrose solution (1.5 liters of solution prepared from AR grade sucrose and tap water, cooled at 10° C. per hour) was found to be −8.7±0.7° C.

1.5 liters of 25 wt % sucrose solution was placed in a glass-walled jacketed vessel and stirred with a Rushton turbine at 240 rpm. A liquid coolant (a glycol/water mixture) was circulated from a heater/cooler unit into the coolant side of the jacket vessel, and returned to the heater/cooler unit. The sucrose solution was initially at an ambient temperature. The coolant temperature was set in the heater/cooler unit (range −7.0 to −7.7° C., see table below). The temperature of the sucrose solution was continuously monitored. After some time (approximately 1 hour), the solution reached a steady state temperature (range −6.3 to −7.3° C., see table below). The system was left for a further 2 hours, during which time the temperatures remained constant. In all of the systems no ice crystals were observed at any time (had ice crystallisation occurred, the solution temperature would have risen dramatically and a thick slurry of ice crystals would have been observed).

| EXAMPLE | COOLANT TEMPERATURE ° C. | STEADY STATE SOLUTION TEMP. ° C. | ICE CRYSTALS? |
|---|---|---|---|
| 1 | −7.5 | −6.8 | NO |
| 2 | −7.7 | −7.1 | NO |
| 3 | −7.0 | −6.3 | NO |
| 4 | −7.7 | −7.1 | NO |

Example 5

Comparative Example with 25 wt % Sucrose Solution

As a comparative example to Examples 1–4, the examples were repeated except the coolant temperature was set to −10.0° C. (i.e. below the metastable limit). Continuous monitoring of the sucrose solution showed that crystallization of ice occurred when the solution had cooled to −8.0° C. After 2 hours the temperature was −4.1° C. was and there was a large phase volume of ice.

Example 6

Continuous Production of Supercooled Fruit Mix

The metastable limit of a fruit mix (40 wt % fruit puree of 12 Brix, 18 wt % sugar, 4 wt % Glucose 42DE, 0.2 wt % stabiliser, 0.2 wt % citric acid, and water to 100 wt %) was measured as described in Examples 1–4. The metastable limit was found to be −7.0° C. The equilibrium melting temperature of the solution was −2.9° C.

The fruit mix at ambient temperature was pumped through a conventional plate heat exchanger, running counter currently at 1 liter/min. The feed temperature of the coolant (40 vol % ethylene glycol solution) was −5.5° C. The outlet temperature of the fruit mix was −4.5° C.; however there were no ice crystals present.

Example 7

Continuous Production of Supercooled and Aerated Ice Cream Premix

An ice cream premix (14.7 wt % butter, 12.2 wt % skimmed milk powder, 15.5 wt % sugar, and water to 100 wt %) was conventionally produced. The equilibrium melting temperature of the premix was −2.3° C. The premix was then pre-aerated by mixing with air in a high shear mixer (Megatron MT3-61, available from Kinematica AG, Lucerne, Switzerland, operating at 1600 rpm, liquid throughput of 1 liter/minute, liquid inlet temperature of 6° C., and a jacket coolant temperature of 1° C.). The premix had a fine dispersion of air bubbles, the air accounting of 50% of the total phase volume.

The aerated mix, at ambient temperature, was pumped through a conventional plate heat exchanger, running counter currently at 1 liter/min. The feed temperature of the coolant (40 vol % ethylene glycol solution) was −5.0° C. The outlet temperature of the premix was −3.5° C. No ice crystals were present in the outlet premix.

Example 8

Supercooling of Water in Fruit/Vegetable

The metastable limit of the water contained in a tomato was obtained as follows:

1) A small thermocouple was pushed into the centre of an whole fresh tomato. The tomato was placed within a waterproof plastic bag, and placed in a water bath (initially at ambient temperature). The temperature of the water bath was decreased by 10° C./hour. The temperature within the tomato was continuously monitored. When ice crystallization occurred, there was a corresponding increase in temperature (due to the latent heat of ice crystallization). The temperature immediately prior to this temperature rise was the metastable limit. The metastable limit was measured to be −4.5° C.

Two whole fresh tomatoes were taken, a thermocouple couple inserted, wrapped in a waterproof plastic bag, and placed into water baths. One tomato (A) was in a water bath with a coolant temperature of −4° C., the other (B) in a water bath with a temperature of −7° C. The temperature of each tomato interior was continuously monitored. After two hours, tomato A had an interior temperature of −3.8° C. No evidence of ice crystallization was apparent on visual inspection of the interior of the tomato. During the cooling of tomato B a temperature rise was observed when the interior temperature was −4.3° C., indicating that ice crystallization had occurred. Visual inspection of the interior showed large amounts of ice present.

Example 9

Continuous production of a 30 wt % supercooled sucrose solution and controlled initiation of ice crystallisation.

The equilibrium melting point temperature of 30 wt % sucrose solution is −2.73° C.

The metastable limit of 30 wt % sucrose solution was determined under the following conditions: 1.5 liters of solution prepared from Tate & Lyle granulated sucrose and tap water, cooled at 10° C. per hour. It was found to be −7.9±0.75° C.

30 wt % sucrose solution was pumped through a plate heat exchanger (P.H.E.) at a throughput of 1 liter/min. The PHE ran counter-currently and the coolant was 40 vol % ethylene glycol solution in water. The PHE had a product volume of approximately 2 liters.

The inlet temperature of the 30 wt % sucrose solution was +5° C.

The coolant temperature was set to −5° C. The temperature of the 30 wt % sucrose solution at the exit of the PHE was −4.6 to −4.8° C. No ice crystals were observed. This corresponded to a supercooling of approximately 2° C. This situation was maintained for a period of hours at these temperatures without the event of nucleation.

The coolant temperature was then set to −8.0° C. which corresponds to a temperature below the measured metastable limit. Within minutes, an ice crystal slurry was observed at the exit of the PHE. Subsequent flow of ice crystal slurry from the PHE was continuous. The PHE did not foul.

Example 10

Continuous production of 15 wt % and 30 wt % supercooled sucrose solutions at different throughputs.

15 wt % and 30 wt % sucrose solutions were pumped through the PHE at the flow rates indicated in the table below. The table shows the product exit temperature from the PHE and the coolant temperature under conditions where no ice crystallisation occurred.

Under these conditions is was possible to achieve 3 degrees of supercooling for the 15 wt % sucrose solution and up to 4 degrees of supercooling for the 30 wt % sucrose solution.

It was found possible to maintain supercooled solutions for a period of hours at these temperatures without the event of nucleation.

| | Equilibrium | Flow Rate through P.H.E. | | | |
| | melting | 0.48 L/min | | 3.44 L/min | |
| Sucrose (weight %) | point temperature (° C.) | $T_{product}$ at exit (° C.) | $T_{coolant}$ (° C.) | $T_{product}$ at exit (° C.) | $T_{coolant}$ (° C.) |
| --- | --- | --- | --- | --- | --- |
| 15 | −1.07 | −4.2 | −5.2 | −4.3 | −5.2 |
| 30 | −2.73 | −6.8 | −7.0 | −5.5 | −6.0 |

The coolant flows at approximately 10 liters/min and varies insignificantly in temperature across the PHE.

We claim:

1. A method for supercooling a product comprising: preparing the product in a form selected from the group consisting of a liquid, a solid and mixtures thereof; contacting the product with a coolant having a temperature of just above the metastable limit temperature of the product, whereby said product is cooled close to the metastable limit temperature without inducing crystallization.

2. A method as defined in claim 1, comprising contacting the product with the coolant in an indirect cooling system.

3. A method as defined in claim 1, wherein the product is an aerated liquid.

4. A method as defined in claim 2 wherein the product is an aerated liquid.

5. A method as defined in claim 1 wherein the product is an ice-cream pre-mix.

6. A method as defined in claim 2 wherein the product is an ice-cream pre-mix.

7. A method as defined in claim 1 wherein the temperature of the coolant is about 0.001° C. above the metastable limit temperature to about 1.5° C. below the equilibrium freezing temperature.

\* \* \* \* \*